April 14, 1970 S. A. ABBAS 3,506,969

BALANCED CAPACITOR READ ONLY STORAGE USING A SINGLE BALANCE LINE FOR TWO DRIVE LINES AND SLOTTED CAPACITIVE PLATES TO INCREASE FRINGING

Filed April 4, 1967 2 Sheets-Sheet 1

INVENTOR
SHAKIR A. ABBAS

BY James E. Murray
ATTORNEY

April 14, 1970 S. A. ABBAS 3,506,969

BALANCED CAPACITOR READ ONLY STORAGE USING A SINGLE BALANCE LINE FOR TWO DRIVE LINES AND SLOTTED CAPACITIVE PLATES TO INCREASE FRINGING

Filed April 4, 1967 2 Sheets-Sheet 2

United States Patent Office 3,506,969
Patented Apr. 14, 1970

3,506,969

BALANCED CAPACITOR READ ONLY STORAGE USING A SINGLE BALANCE LINE FOR THE TWO DRIVE LINES AND SLOTTED CAPACITIVE PLATES TO INCREASE FRINGING

Shakir A. Abbas, Wappingers Falls, N.Y., assignor to International Business Machines Corporation, Armonk, N.Y., a corporation of New York Filed Apr. 4, 1967, Ser. No. 628,373
Int. Cl. G11c *17/00, 5/02*
U.S. Cl. 340—173 1 Claim

ABSTRACT OF THE DISCLOSURE

This specification describes a balanced capacitor read only memory which has spaced word drive lines intersecting with pairs of bit sense lines to form storage bit positions along the drive lines at the intersections. At each such bit position a capacitive member couples the drive line to one of the sense lines in the bit sense line pair at the bit position. The information stored at the bit position will depend on which sense line is coupled to the drive line by the capacitive member. If the capacitive member couples the drive line to one of the sense lines in the pair a "1" is stored. If the capacitive member couples the drive line to the other sense line, a "0" is stored. In this memory there is a single-balance line associated with each two drive lines. This balance line is coupled by an additional capacitive member at each bit position to the sense line which is not coupled to the drive line at that bit positon. Therefore there is a capacitive coupling to each of the sense lines at each of the bit positions irrespective of the information stored in the capacitive read only memory. Preferably the balance line is located between the two drive lines with which it is associated and all the capacitive members are positioned between the drive lines and the balance lines.

BACKGROUND OF THE INVENTION

This invention relates to capacitor read only memories and more particularly to balanced capacitor read only memories.

An article published on pages 47 and 48 of the January 1963 issue of the IBM Technical Disclosure Bulletin describes a balanced capacitor read only memory which was developed by A. Proudman and C. E. Owen. Such capacitive memories have a number of parallel lines printed on one side of a dielectric board and pairs of parallel sense lines printed on the other side of the dielectric board at right angles to the drive lines so that each drive line intersects each pair of sense lines. At each of these intersections there is a conductive area connected to the drive lines. These conductive areas form a capacitive coupling between each of the drive lines and one of the sense lines in each pair of sense lines so that the intersections of each drive line with each pair of sense lines represents a bit position of the memory. If the drive line is coupled to one of the sense lines in the pair, a "1" is stored at the bit position. If the drive line is coupled to the other of the sense lines in the pair, a "0" is stored at the bit position.

Information is read from this memory by transmitting a pulse down the drive line and sensing pulses on each pair of sense lines with a differential amplifier connected to the two sense lines in the pair. To eliminate any imbalance in capacitive loading on the sense lines of the pair these memories have a balance line associated with each drive line. Each balance line, like the drive line with which it is associated, is connected to a conductive area. These conductive areas capacitively couple the balance lines to the sense line not coupled to the drive line. In other words, they complement the drive lines. Therefore, there is a capacitive coupling to each of the bit sense lines at each of the bit positions. This assures equal capacitive loading on the sense lines of the pairs irrespective of the information stored in the bit positions along the line.

SUMMARY

While the above arrangement is satisfactory for some applications, it has been found that as the size and speed of computers is increased it is desirable to increase the bit density or in other words the number of bit positions in a given area of the memory. Therefore in accordance with the present invention a new balanced capacitor read only memory is provided. In this memory there is a balance line positioned between each two drive lines. Located between the balance line and drive lines there are separate conductive areas positioned over each of the sense lines at each of bit positions. One of the conductive areas at each bit position is connected to the drive line and the other conductive area in the bit position is connected to the balance line. This configuration allows a single balance line to serve the two drive lines between which it is positioned and thereby reduces by a factor of two the number of balance lines in the memory.

In accordance with another aspect of this invention the conductive areas are slotted so as to obtain more capacitive coupling to the sense lines at a certain range of dielectric thickness and thereby allow a reduction in the size of the conductive areas.

Therefore it is an object of the present invention to provide a new balanced capacitor read only memory.

It is another object of the invention to increase the bit density of balanced capacitor read only memories.

It is another object of the invention to increase the effective capacitive coupling between the conductive areas and the sense lines.

It is a further object to provide a better arrangement of bit lines, drive ilnes, balance lines and conductive areas in a balanced capacitive read only memory.

DESCRIPTION OF DRAWINGS

The foregoing and other objects and advantages of the invention will be apparent from the following more particular description of the preferred embodiments of the invention as illustrated in the accompanying drawings, of which.

DESCRIPTION OF PREFERRED EMBODIMENTS

Figure 1:
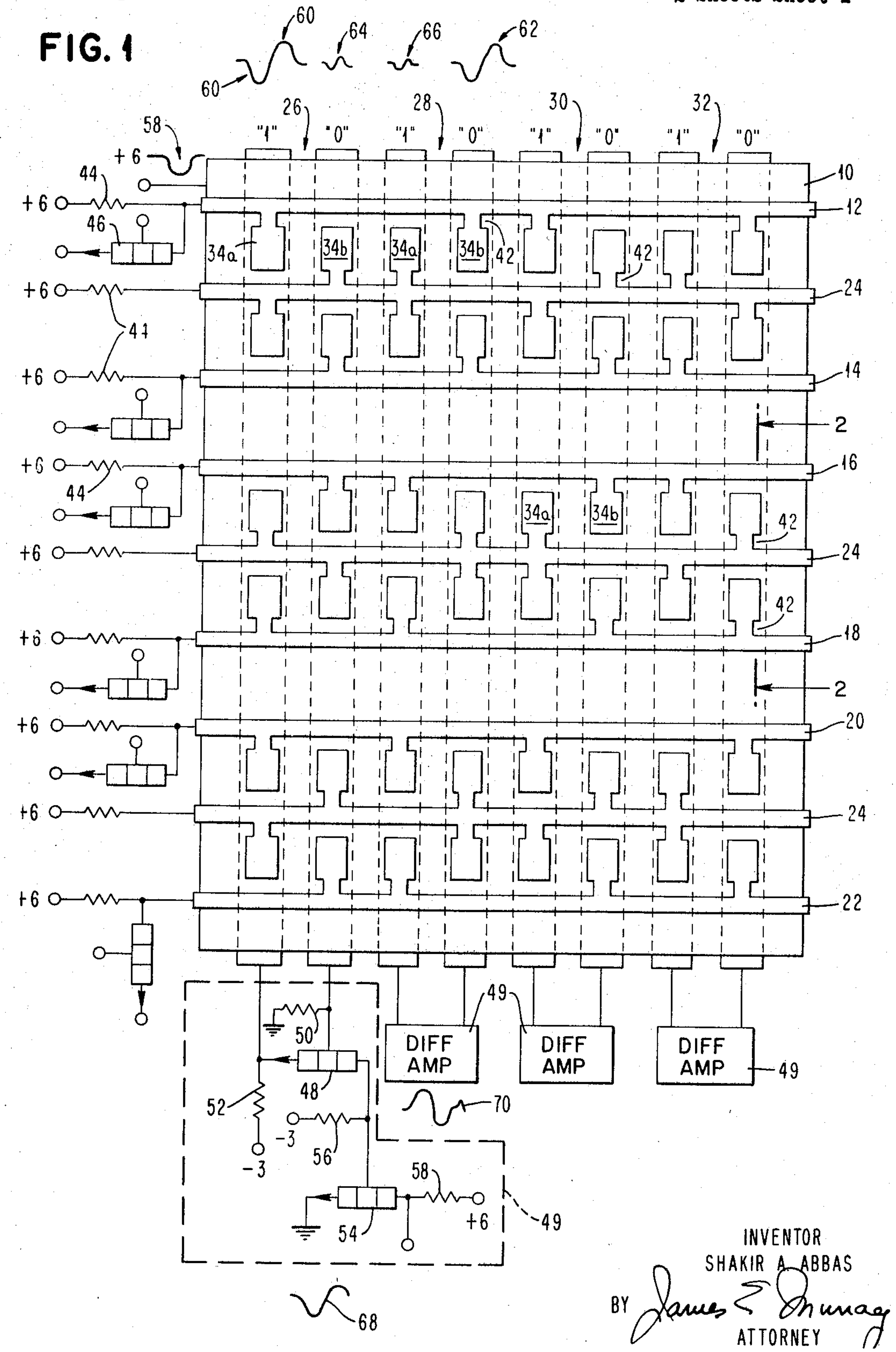
FIGURE 1 shows a plan view of a 6 x 4 balanced capacitor memory of the present invention.
Figure 2:
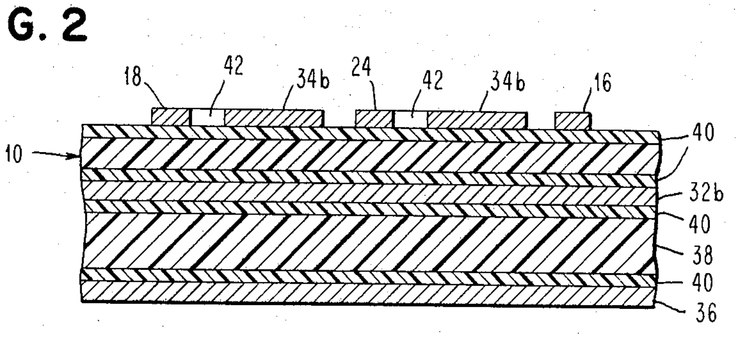
FIGURE 2 is a section taken along lines 2—2 in FIGURE 1.

As shown in FIGURES 1 and 2, six parallel printed circuit drive lines 12 through 22 are located on one side of a plastic board 10. Positioned on the same side of the board between each two drive lines 12 is a balance line 24 which is parallel to the drive lines. On the opposite side of the board 10 are four parallel pairs of printed circuit sense lines 26 through 32. Where each pair of sense lines intersect a drive line, there are two printed circuit lands or flags 34*a* and *b*. One of these printed circuit lands is connected to the drive line and the other of the printed circuit lands is connected to the balance line.

Each of the printed circuit lands 34 is positioned over one of the sense lines in the pair and thus provides capacitive coupling to that sense line. Therefore flag 34*a* provides capacitive coupling to the "1" sense lines while lands 34*b* provide coupling to "0" sense lines. If land 34*a* is electrically connected to the drive lines it represents a stored "1" in the bit position at which the land is located and if 34*b* is connected to the drive line it represents a stored "0" at the bit position at which the bit is located. For instance, at the intersection of sense lines 26 and drive line 12 there is a "1" stored while the intersection of sense lines 28 and drive line 12 a "0" is stored.

As shown in FIGURE 2, a ground plane 36 is spaced from the sense lines by a second plastic board 38. The plastic boards 10 and 38 each comprise a core of Mylar or other suitable plastic with a polyester cement layer 40 on each side for adherence of the printed circuit copper wires to the core.

The printed circuit copper wires and lands can be printed on the board 10 by known printed circuit techniques. One way of doing this would be to have one mask to print the uniform sense lines 26–32 on one side of the board 10 and another mask to print the drive lines 12–22. the balance lines 24 and the flags 34 on the other side of the board 10. The connections 42 between the flags and the drive lines or the balance lines can then be put on a separate mask which prior to the printing process is placed in registration with the mask for printing the drive lines, balance lines and flags. Therefore all that need be done to change the information stored in the memory cells is to change the mask for the connections 42.

One end of each of the drive lines 12–22 and balance lines 24 is connected through a resistor 44 to a +6 volt power supply and the same end of each of the drive lines 12 through 22 is connected to the collector of a transistor 46. The other ends of the drive lines and balance lines are open circuited. As shall be seen later transistors 46 are used to read the information stored in the various bit positions of the memory. In this configuration transistors 46 are normally biased nonconducting.

Each pair of sense lines 26 through 32 are also connected to a transistor 48 in a differential sense amplifier 49. The "1" sense lines are connected to the emitters of these transistors 48 while the "0" sense lines are connected to the bases of these transistors. The base of the transistors 48 are also coupled to ground through resistor 50 while the emitters of the transistors 48 are also connected to a −3 volt power supply by resistor 52. The collectors of the transistors 48 are connected to the base of transistors 54 and through resistor 56 to a −3 volt power supply. The emitters of the transistors 54 are all connected to ground and the collectors of the transistors 54 are connected by resistors 58 to the positive terminal of a 6 volt power supply. Transistors 48 and 54 are biased normally conducting in this circuit by the mentioned 3 and 6 volt power supplies and operate in a linear manner.

In operation, transistors 46 are normally nonconducting. Therefore, drive lines 12 through 22 are at +6 volts. Since transistor 48 is conducting and resistors 50 and 52 are equal, the sense lines 26 through 32 will each be at approximately —1.5 volts potential. Therefore the capacitances between the flags 34 and the sense lines 26 through 32 will be charged to approximately 7.5 volts.

Let use now assume that we wish to read the information stored on drive line 12. The transistor 46 connected to that drive line is rendered conductive to cause the voltage on the drive line 12 to drop from +6 volts towards 0 volt and then return to +6 volts in the manner illustrated at 58. The change in voltage induces a current in the sense lines coupled by the flags 34*a* equal to the product of the capacitance and the rate of change of voltage and in such a direction as to discharge and later charge the capacitance. The sense lines coupled to the drive line by the flags 34 will therefore first go above their quiescent level as the capacitors discharge and then decay towards their quiescent level as the capacitor is recharged. This produces a pulse with a negative going portion and a positive going portion as illustrated at 60 and 62.

Because the drive line 12 does pass over them, the sense lines not coupled to the drive lines by the flags 34 also experience a fluctuation in voltage. However this fluctuation is not as great because of the small capacitive coupling between these sense lines and the drive line 12. Comparative sense lines voltages are illustrated at 64 and 66.

The fluctuations on the sense lines are detected by the sensing transistor 48 and cause a change in potential at the collector of transistors 48. If a "1" is stored at any given bit position, as is the case of the bit position at the intersection of the sense lines 26 with the drive line 12, the transistor 48 will be driven to conduct more and then less because the "1" sense line and the emitter of transistor 48 will swing above and then below their quiescent value. Therefore, transistor 48 initially conducts more and then conducts less. This causes the voltage on the collector of transistor 48 to initially decrease and then increase as shown at 68. If a "0" is stored in any bit position as in the case of the bit position located at the intersection of drive line 12 and sense lines 28 the bit line 28*b* will swing negative and then positive. This will cause the emitter of transistors 48 to first go more negative and then more positive causing transistor 48 to initially conduct less and then conduct more. This causes the voltage on the collector of transistor 48 to increase and then decrease as shown at 70. Thus the outputs at the collector of transistor 48 are bipolar, a "1" being distinguished from a "0" in that the nagative going portion of a "1" pulse occurs prior to the positive going portion while the positive going portion of the "0" pulse occurs prior to the negative going portion.

From the above description is should be apparent that increased bit density can be obtained by this system. This is because of the need for only one balance line for every two drive lines while previous systems required a balance line for every drive line. In addition the compact arrangement of the flags between the bit and drive lines as shown and described also decreases the area necessary to accommodate a bit position.

Figure 3:
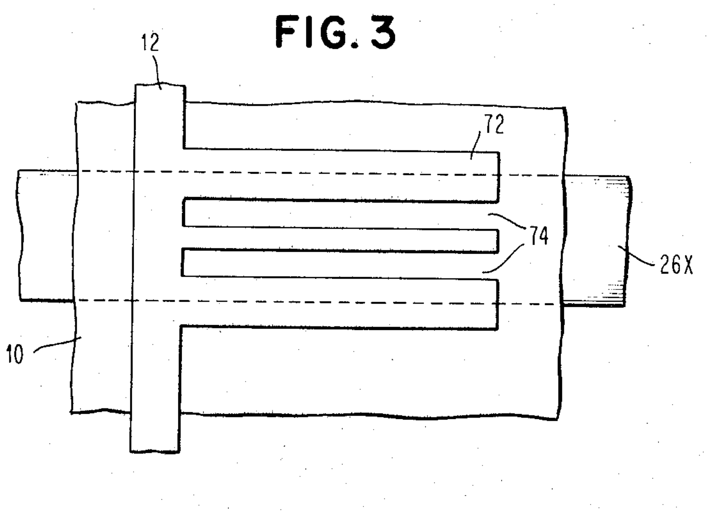
FIGURE 3 is the alternative slotted conductive area mentioned previously.
Figure 4:
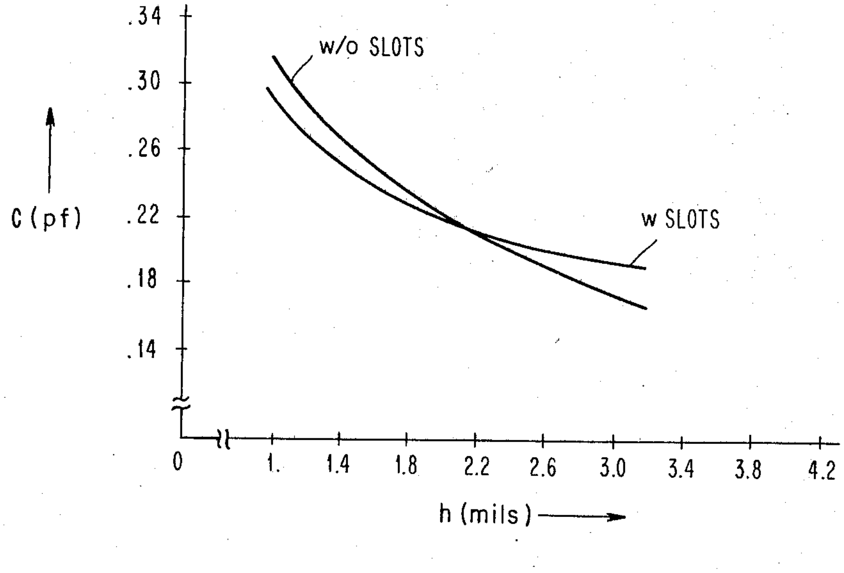
FIGURE 4 is a graph illustrating the advantage of the slotted conductive area shown in FIGURE 2.

A further decrease in the area necessary to accommodate a bit position can be obtained by employing the flags 72 shown in FIGURE 3. The difference between these flaps 72 and the ones discussed previously are the addition of the slots 74 in the flags. Though it would seem that the reduction of the conductive area of the flag 72 incurred by the introduction of the slot 74 would decrease the capacitance of the flag, it does not. This is apparently because the capacitance due to the parallel-plate interaction between the flag 72 and the sense line 26*a* is inversely proportional to the height of the dielectric while capacitance due to fringing is not so strongly dependent upon the height. Therefore there is a certain height above which one gains more in fringing capacitance by slotting than one loses due to the loss in conductive area due to the slots. This is illustrated in FIGURE 4 where the capacitance of equivalent slotted and unslotted flags is compared at different thicknesses of the dielectric 10. The dimensions of the flags 72 used in obtaining the information for the curve in FIGURE 4 are 25 by 16 mils and have 2 mil slots 74 in them while the bit lines 26 are 10 mils wide. An alternative arrangement would have slots in the bit sense lines instead of the flags.

While the invention has been particularly shown and described with reference to the preferred embodiments thereof, it will be understood by those skilled in the art that various changes in form and details may be made therein without departing from the spirit and scope of the invention.

What is claimed is:

1. In a balanced capacitor read only storage an arrangement of drive, sense and balance lines comprising:

(a) a plurality of pairs of sense lines;

(b) two drive lines intersecting the sense lines to form at the intersections bit positions along each of the drive lines;

(c) one balance line associated with both the drive lines; and (d) first and second capacitive members at each bit position along both sense lines, each of the first capacitive members coupling one of the sense lines in this sense line pair to the drive line at that bit position and each of the second of the capacitive members coupling the other of the sense lines to the balance line at the bit position along both the drive lines;

(e) said capacitive members each comprising spaced conductive parallel plates one of which is slotted to increase fringing and dielectric means between the plates for spacing the plates sufficiently far apart to cause the increase in capacitance due to such fringing to be greater than the loss in capacitance due to the reduction in conductive area of the slotted plate whereby a greater capacitance is obtained for a given plate size and spacing.

References Cited

UNITED STATES PATENTS

| | | | |
|---|---|---|---|
| 2,405,529 | 8/1946 | Smith | 317—261 |
| 3,404,382 | 10/1968 | Rosenheck | 340—173 |

FOREIGN PATENTS

| | | |
|---|---|---|
| 367,067 | 6/1964 | France. |

OTHER REFERENCES

Grubb et al., Drive System With Noise Cancellation, IBM Technical Disclosure Bulletin, vol. 7, No. 5, October 1964, pp. 359–360.

Owen, Read-Only Memory, IBM Technical Disclosure Bulletin, Jan, 1963, pp. 47–48.

Spencer, Capacitor Read-Only Store, IBM Tech. Discl. Bulletin, May 1965, p. 1175.

Southard, Balanced Capacitor Read-Only Storage Unit, IBM Tech. Discl. Bulletin, June, 1965, pp. 82–83.

Tunis, Balanced Capacitor Read-Only Storage Unit, IBM Tech. Discl. Bulletin, June, 1965, pp. 84–85.

TERRELL W. FEARS, Primary Examiner

H. L. BERNSTEIN, Assistant Examiner

U.S. Cl. X.R.

340—166